United States Patent
Shiiyama

(10) Patent No.: US 8,644,683 B2
(45) Date of Patent: Feb. 4, 2014

(54) MOVING IMAGE DATA PROCESSING APPARATUS AND METHOD

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1484 days.

(21) Appl. No.: 11/751,107

(22) Filed: May 21, 2007

(65) Prior Publication Data

US 2007/0230807 A1    Oct. 4, 2007

Related U.S. Application Data

(62) Division of application No. 10/242,618, filed on Sep. 13, 2002, now Pat. No. 7,257,311.

(30) Foreign Application Priority Data

Sep. 18, 2001    (JP) .................................. 2001-283960

(51) Int. Cl.
*G11B 27/00*    (2006.01)
*G11B 27/034*   (2006.01)

(52) U.S. Cl.
CPC .................................. *G11B 27/034* (2013.01)
USPC ......................................... 386/278; 715/723

(58) Field of Classification Search
CPC ................................................... G11B 27/034
USPC ................... 386/278, 279, 281; 715/719, 723
See application file for complete search history.

(56) References Cited

U.S. PATENT DOCUMENTS

| | | | |
|---|---|---|---|
| 6,192,183 B1 | 2/2001 | Taniguchi et al. | 386/52 |
| 6,289,166 B1* | 9/2001 | Uno et al. | 386/329 |
| 6,370,316 B1 | 4/2002 | Yamada et al. | 386/46 |
| 6,462,754 B1* | 10/2002 | Chakraborty et al. | 715/723 |
| 7,257,311 B2 | 8/2007 | Shiiyama | |
| 2002/0003881 A1* | 1/2002 | Reitmeier et al. | 380/210 |
| 2006/0253780 A1* | 11/2006 | Munetsugu et al. | 715/719 |

FOREIGN PATENT DOCUMENTS

| | | |
|---|---|---|
| EP | 0810794 | 12/1997 |
| JP | 9-322111 | 12/1997 |
| JP | 11-238071 | 8/1999 |

* cited by examiner

*Primary Examiner* — Thai Tran
*Assistant Examiner* — Mishawn Dunn
(74) *Attorney, Agent, or Firm* — Fitzpatrick, Cella, Harper & Scinto

(57) ABSTRACT

A moving image processing apparatus gives an ID to a video segment obtained by dividing moving image data, and stores information for associating a section of each video segment with the ID as video segment section information. Here, meta-data corresponding to each video segment is managed by associating the meta-data with the ID given to each video segment. In editing operations, editing in units of a video segment is performed, and an arrangement of video segment IDs is manipulated. Therefore, even if the editing is performed, there arises no inconsistency in referring to meta-data information so that it is equivalent to having the meta-data updated in synchronization with the moving image editing. Thus, it is possible to have virtual editing of the moving image automatically followed by an update of the meta-data and also alleviate a burden of reediting the meta-data of an editor.

13 Claims, 14 Drawing Sheets

| SEGMENT NO. | START POINT (TIME CODE) | END POINT (TIME CODE) |
|---|---|---|
| 0 | 00:00:00:00 | 00:00:02:00 |
| 1 | 00:00:02:01 | 00:00:05:00 |
| 2 | 00:00:05:01 | 00:00:17:00 |
| 3 | 00:00:17:01 | 00:00:30:00 |
| 4 | 00:00:30:01 | 00:00:42:00 |
| 5 | 00:00:42:01 | 00:01:00:00 |

FIG. 11

| SEGMENT ID | OBJECT | META-DATA | | |
|---|---|---|---|---|
| | | ANNOTATION | REPRESENTATIVE FRAME POSITION | OTHER |
| 0 | DESK, PC, SLEEVE | PLACE PC ON DESK | 00:00:01:25 | |
| 1 | DESK, PC, HAND, CD | INSERT CD IN PC | 00:00:03:00 | |
| 2 | DESK, PC, HAND | CLOSE TRAY | 00:00:10:00 | |
| 3 | PC, FACE, BODY | A WOMAN USING PC | 00:00:20:00 | |
| 4 | PC, SCREEN | CLOSE-UP PC SCREEN | 00:00:35:00 | |
| 5 | LOGO | COMPANY LOGO APPEARS | 00:00:58:00 | |

| VIDEO SEGMENT | PARTIAL REPRODUCTION SECTION | |
|---|---|---|
| | REPRODUCTION START POINT | REPRODUCTION END POINT |
| 0 | 00:00:00:10 | 00:00:01:29 |
| 1 | 00:00:02:30 | 00:00:04:00 |
| 2 | 00:00:08:00 | 00:00:11:00 |
| 3 | 00:00:18:00 | 00:00:23:00 |
| 4 | 00:00:34:00 | 00:00:37:00 |
| 5 | 00:00:57:00 | 00:00:59:00 |

| ORDER / STATE | 1 | 2 | 3 | 4 | 5 | 6 |
|---|---|---|---|---|---|---|
| INITIAL | 0 | 1 | 2 | 3 | 4 | 5 |
| EDITED | 0 | 1 | 3 | 4 | *2 | *5 |

~1301

*:INDICATES SEGMENT IN DELETED STATE

| ORDER OF REPRODUCTION | REPRODUCED VIDEO SEGMENT | PARTIAL REPRODUCTION SECTION | |
| --- | --- | --- | --- |
| | | REPRODUCTION START POINT | REPRODUCTION END POINT |
| 1 | 0 | 00:00:00:10 | 00:00:01:29 |
| 2 | 1 | 00:00:02:30 | 00:00:04:00 |
| 3 | 3 | 00:00:18:00 | 00:00:23:00 |
| 4 | 4 | 00:00:34:00 | 00:00:37:00 |

# MOVING IMAGE DATA PROCESSING APPARATUS AND METHOD

This application is a division of application Ser. No. 10/242,618 filed Sep. 13, 2002.

FIELD OF THE INVENTION

The present invention relates to a moving image data processing apparatus and a method thereof.

BACKGROUND OF THE INVENTION

As a conventional method of recording moving image data, it has been stored in a tape device such as a magnetic tape. As it is impossible to get random access to the moving image data stored in such a tape device, it is necessary to actually create a moving image stream in video editing. In recent years, however, it became possible to store moving image in a device allowing the random access such as a hard disk, and so virtual editing has become possible by successively specifying moving image sections to be reproduced.

Such a virtual editing is very convenient since it allows reediting and so on to be performed easily without losing/altering original information. In addition, in the case where the moving image is stored in a random-accessible device, it is possible to provide a multifunction moving image reproducing apparatus since it allows a moving image search (scene search) with meta-data and a summary reproduction for digestedly reproducing the moving image.

When having edited the moving image, it is necessary to edit the meta-data and summary data by following it. For instance, in the case where the contents of moving image editing are not reflected on the meta-data, there is a possibility that a portion not included in the edited moving image is searched when searching and reproducing the edited moving image with the meta-data. To be more specific, consideration must be given to synchronizing the virtual editing of the moving image with an update of the meta-data so that, in the case where a video segment is searched for by using the meta-data, the video segment deleted by the virtual editing will not show in search hit results.

In addition, while the contents are checked and grasped by seeing a summary of the moving image in the case where there is a large amount of moving image, there arises an inconsistency between the edited moving image and the summary when the summary is reproduced if the contents of moving image editing are not reflected on the summary data. For instance, in the case where an arrangement of the video segments is changed or the video segment is deleted in the virtual editing, order of the scenes by the summary reproduction is different from the edited moving image or the deleted scenes are reproduced so that it gives a sense of incongruity to a person seeing the moving image.

However, it is very burdensome to edit the meta-data and summary data in conjunction with the moving image editing, and there is a tendency that trouble of editing work rather increases even if the editing of the moving image itself becomes easier.

SUMMARY OF THE INVENTION

The present invention has been achieved in view of the above problems, and an object thereof is to have an adaptation of meta-data search result automatically follow virtual editing of moving image and alleviate a burden of reediting the meta-data of an editor.

In addition, another object of the present invention is to render summary result automatically adaptive following the virtual editing of the moving image so as to allow a summary reproduction which does not give a sense of incongruity even after the editing of the moving image.

According to the present invention, the foregoing object is attained by providing a moving image data processing apparatus, comprising:

group managing means for dividing moving image data into groups comprised of a plurality of frames and giving them IDs to manage each group;

editing result storing means for storing an arrangement of the IDs obtained as editing results of the moving image data;

moving image reproducing means for reproducing the groups according to the arrangement of the IDs stored by the editing result storing means and thereby reproducing the moving image data as the editing results; and meta-data managing means for managing meta-data corresponding to the groups by associating it with the IDs corresponding to the groups.

According to the another aspect of the present invention, the foregoing object is attained by providing a moving image data processing method, comprising:

a group managing step of dividing moving image data into groups comprised of a plurality of frames and giving them IDs to manage each group;

an editing result storing step of storing an arrangement of the IDs obtained as editing results of the moving image data;

moving image reproducing step of reproducing the groups according to the arrangement of the IDs stored by the editing result storing means and thereby reproducing the moving image data as the editing results; and a meta-data managing step of managing meta-data corresponding to the groups by associating it with the IDs corresponding to the groups.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram showing an example of a data configuration of the video segment section information according to this embodiment;

FIG. 11 is a diagram showing an example of a data configuration of meta-data information according to this embodiment;

FIG. 12 is a diagram showing an example of a data configuration of partial reproduction section information for summary reproduction according to this embodiment;

FIG. 13 is a diagram showing an example of a data configuration of editing result information according to this embodiment; and FIG. 14 is a diagram showing an example of the partial reproduction section information for the summary reproduction reflecting editing results.

DETAILED DESCRIPTION OF THE PREFERRED EMBODIMENTS

Preferred embodiments of the present invention will now be described in detail in accordance with the accompanying drawings.

Figure 1:
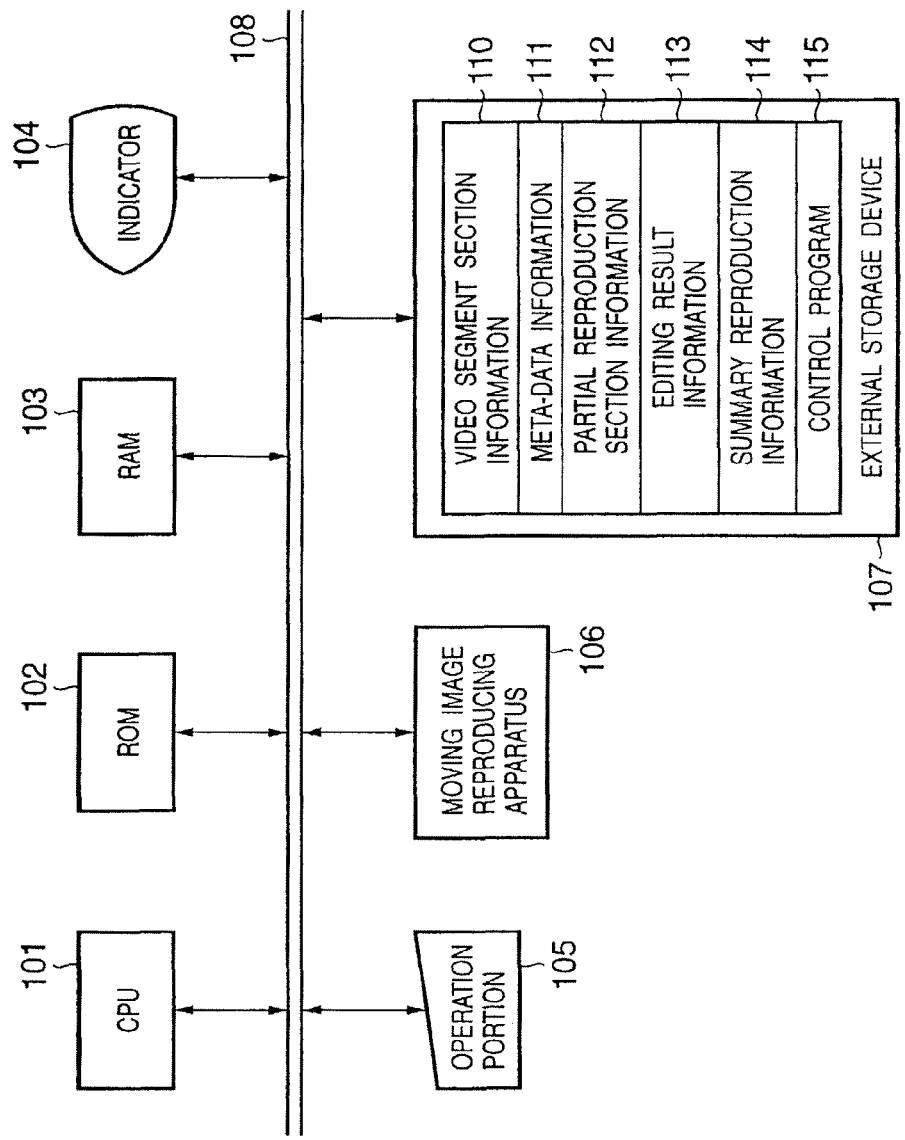
FIG. 1 is a block diagram showing a configuration of a moving image processing apparatus according to this embodiment.

FIG. 1 is a block diagram showing a configuration of a moving image processing apparatus according to this embodiment. In FIG. 1, reference numeral 101 denotes a CPU, which performs various types of control including the one indicated in a flow chart mentioned later by executing a control program stored in ROM 102 or RAM 103. Reference numeral 102 denotes a ROM, which has the control program executed by the CPU 101 and various types of data stored therein. Reference numeral 103 denotes a RAM, which provides an area for loading the control program stored in an external storage device and a work area for the CPU 101 to perform the various types of control.

Reference numeral 104 denotes an indicator, which performs various indications such as moving image reproduction. Reference numeral 105 denotes an operation portion, which is equipped with a keyboard and a mouse. Reference numeral 106 denotes a moving image reproducing apparatus, which reproduces moving image recorded on a DVD for instance. Reference numeral 107 denotes an external storage device, which stores video segment section information 110, meta-data information 111, partial reproduction section information 112, editing result information 113 and summary reproduction information 114 in addition to a control program 115 to be executed by the CPU 101. The information indicated by 110 to 114 is generated and held for each piece of moving image, and details thereof will be described later respectively. Reference numeral 108 denotes a system bus for connecting the above-mentioned configurations.

Operation of the moving image processing apparatus according to this embodiment having the above configuration will be described hereafter.

Figure 2:
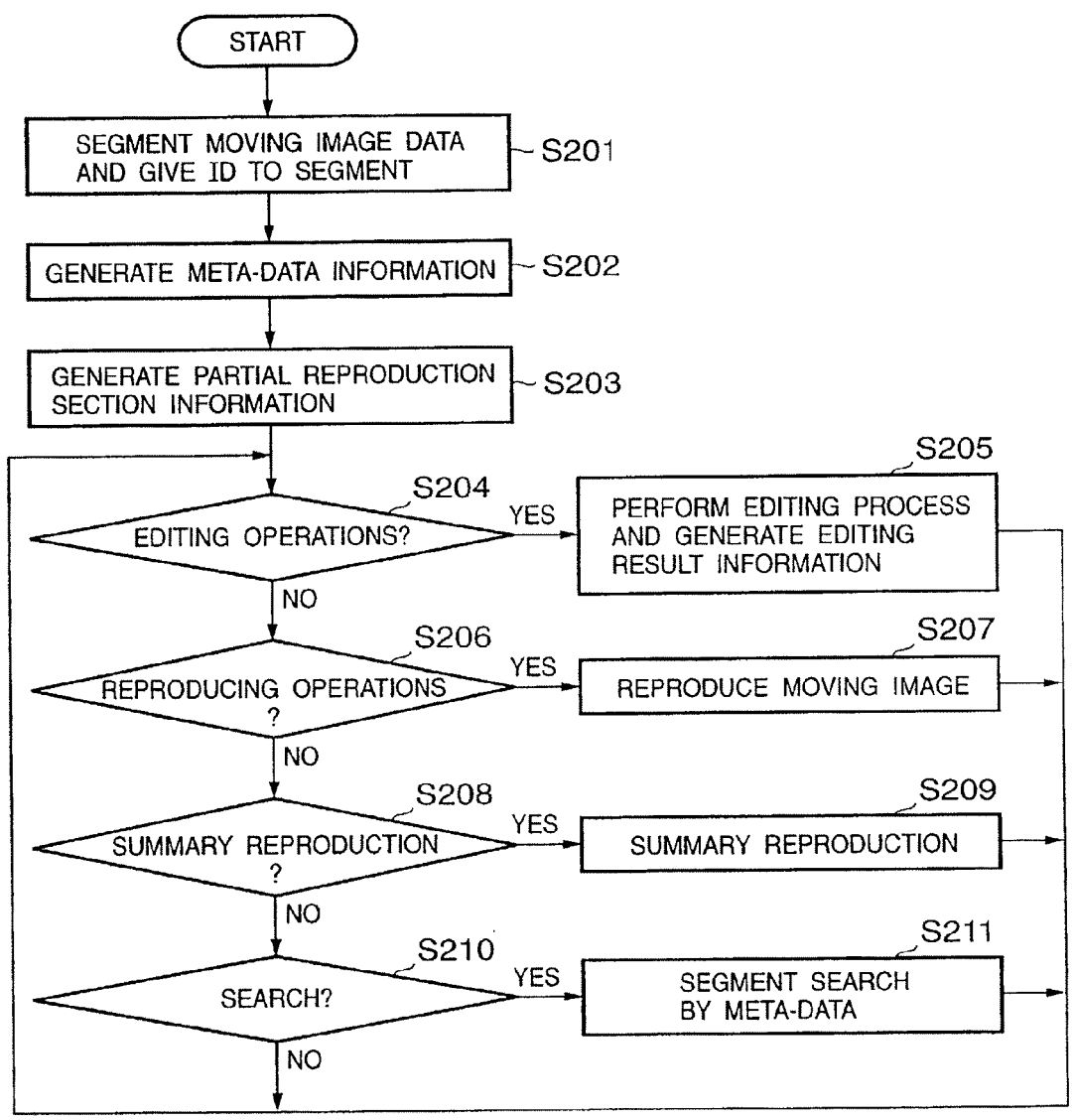
FIG. 2 is a flowchart showing an operation overview of the moving image processing apparatus according to this embodiment.

FIG. 2 is a flowchart showing an operation overview of the moving image processing apparatus according to this embodiment. First, moving image data is segmented in step S201, and an ID is given to each segment so as to manage it. The process in step S201 will be further described in detail by referring to FIGS. 9 and 10.

Figure 3:
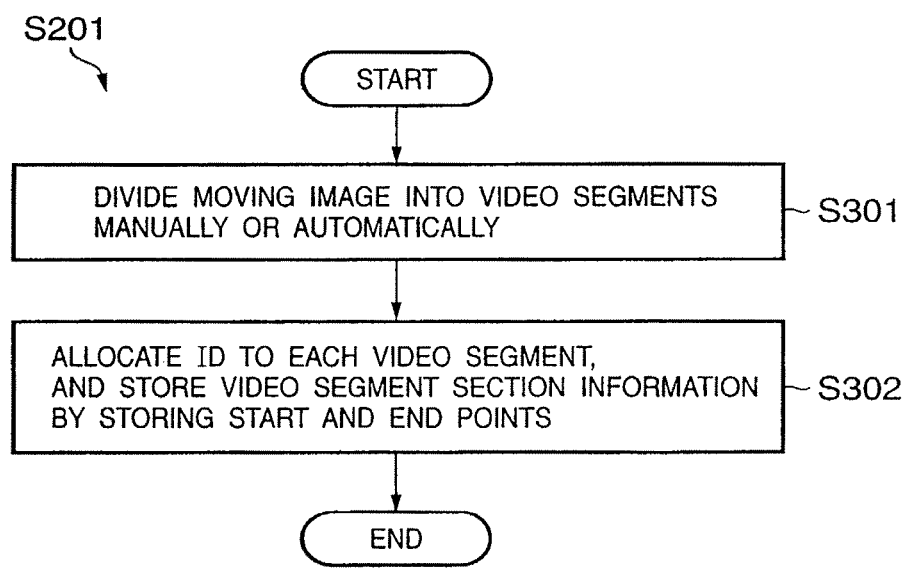
FIG. 3 is a flowchart describing a generation process of video segment section information according to this embodiment.
Figure 9:
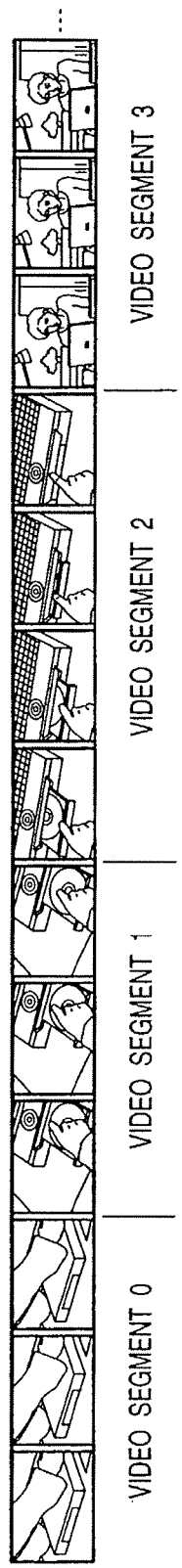
FIG. 9 is a drawing showing a concept of division into video segments according to this embodiment.

FIG. 3 is a flowchart describing a generation process of the video segment section information according to this embodiment. FIG. 9 is a drawing showing a concept of the division into the video segments according to this embodiment. In addition, FIG. 10 is a diagram showing an example of data structure of the video segment section information 110 according to this embodiment.

In step S201, a series of image frames are divided into video segments comprised of a plurality of image frames as shown in FIG. 9. Moreover, the following can be named as the method of the division into the video segments. (1) To give an instruction from the operation portion 105 to the displayed screen and manually divide them into video segments. (2) To automatically detect scene changes and divide them into video segments according to the detection results. Or (3) To automatically detect the scene changes and divide them into video segments, and manually correct them thereafter. It is possible, as a matter of course, to adopt a method other than these, and so there can be any method of division into the video segments.

Next, IDs are sequentially allocated to a plurality of video segments in step S202. And these IDs are used to generate the video segment section information 110 as shown in FIG. 10 for managing the video segments and stores it in the external storage device 107.

As shown in FIG. 10, the video segment section information according to this embodiment represents a section of each segment with a start point and an end point of each video segment. Moreover, while section information (start point and end point) is represented by a time code in FIG. 10, a frame number may also be used. To be more specific, it may be any representation method as far as it can represent a video section.

Figure 4:
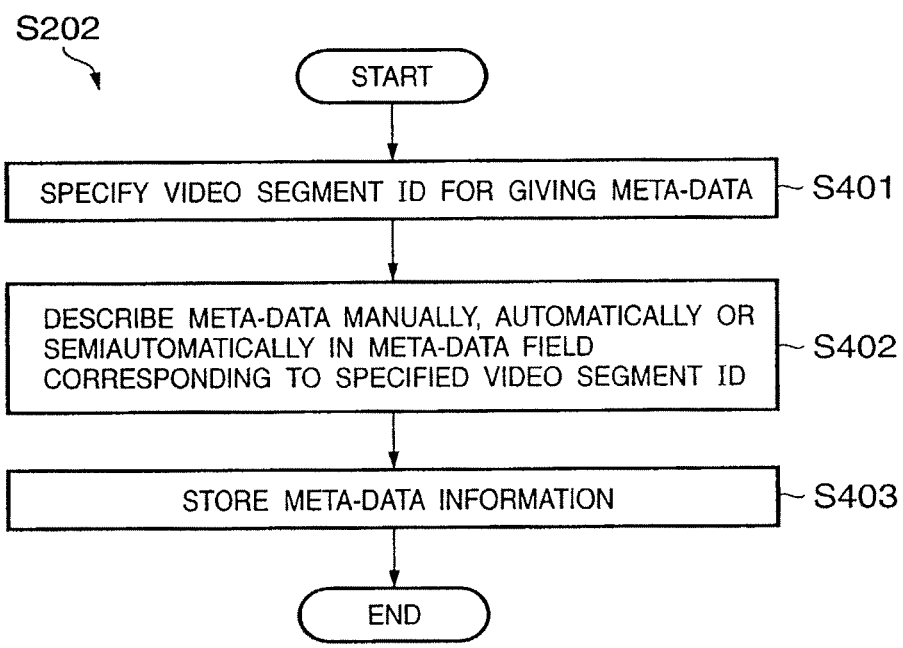
FIG. 4 is a flowchart describing a generation procedure of meta-data information.

Returning to FIG. 2 and finishes the process in step S201 and then proceeds to step S202 to have the meta-data information 111 generated and stored in the external storage device 107. This process will be further described in detail by referring to FIGS. 4 and 11. FIG. 4 is a flowchart describing a generation procedure of meta-data information. In addition, FIG. 11 is a diagram showing an example of a data configuration of the meta-data information according to this embodiment.

First, a video segment ID for giving the meta-data is specified in step S401. As for the method of specifying the ID, an ID number may be directly inputted from the operation portion 105, or the video segment ID including the desired scene may be identified by performing a predetermined operation (such as clicking on a moving image reproduction area) at the desired scene in the middle of moving image reproduction.

Next, in step S402, the meta-data is manually, automatically or semiautomatically described in a meta-data field corresponding to the specified video segment ID. Moreover, the following examples can be named as the cases of automatic or semiautomatic description. For instance, the date and time can be fully automatically given. In addition, if there is a GPS, the place can also be automatically given, and a building name and so on are manually added in the case of adding them to a rough placename. Furthermore, in the case where proceeding events and a timetable are clear as in a wedding, there is a possibility that the meta-data such as "ceremony," "wedding party," and more detailedly, "exchange of rings," "kiss," "entrance," "guest of honor's speech," "toast" and "cake cutting" may be given to the video segment, even though there may be errors to an extent, by using pattern matching to estimate time information and time series-related matters. It is called "automatic" give in this embodiment. In addition, it is called "semiautomatic" give in the case where an error made by the automatic give is corrected by a human being or what can be automatically given and what cannot are mixed. And in step S403, it is stored as the meta-data information 111 in the external storage device 107. FIG. 11 shows an example of a meta-data schema. In this example, a table is created for each piece of moving image, and the meta-data described in step S402 is managed for each video segment ID.

Figure 5:
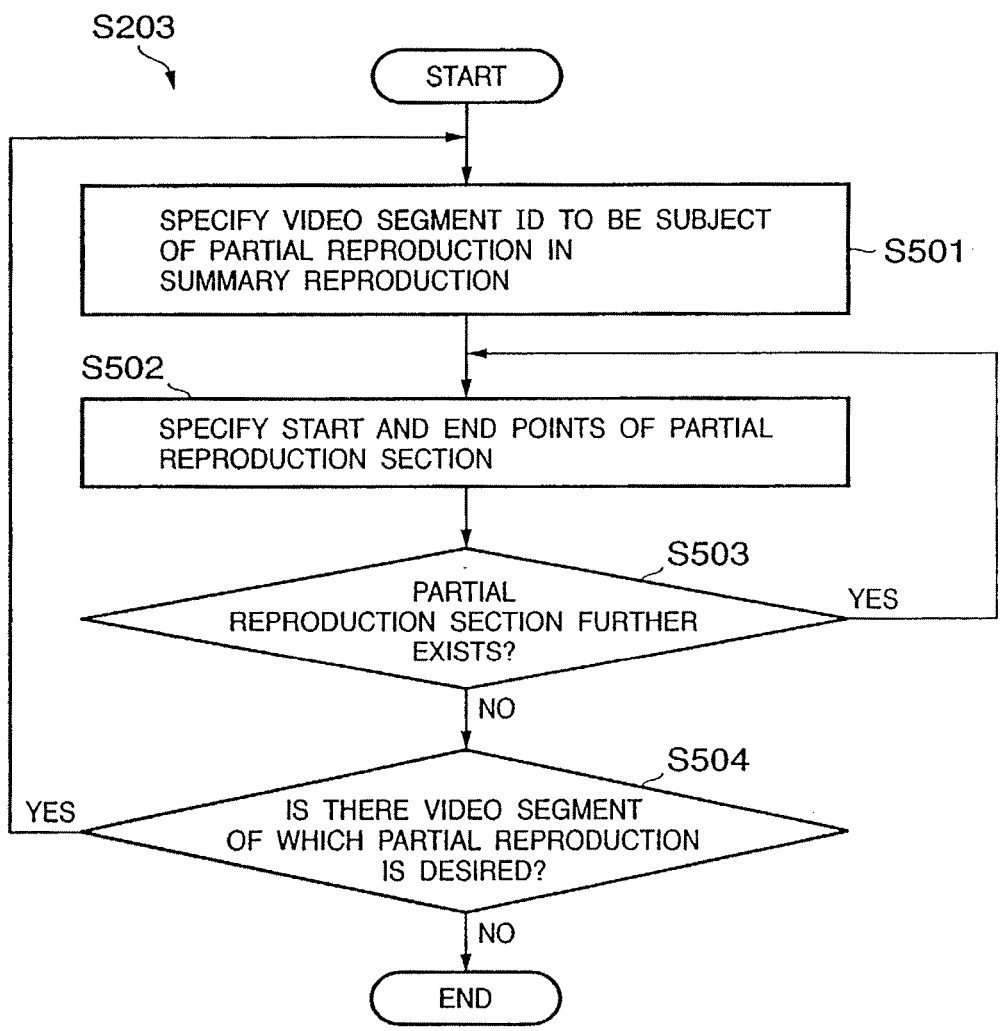
FIG. 5 is a flowchart describing the generation procedure of partial reproduction section information according to this embodiment.

Returning to FIG. 2, in step S203 next, the partial reproduction section information 112 for summary reproduction is generated and is stored in the external storage device 107. FIG. 5 is a flowchart describing the generation procedure of the partial reproduction section information in step S203. In addition, FIG. 12 is a diagram showing an example of a data configuration of partial reproduction section information for the summary reproduction according to this embodiment. Moving image summary referred to here sequentially reproduces partial moving image. Moreover, while there is one partial reproduction section for summary in each video segment in order to simplify the description in FIG. 12, it does not indicate a limit to the present invention and it is possible to have an arbitrary number of partial reproduction sections for each video segment. To be more specific, the partial moving image to be summary-reproduced which is registered for each video segment may be either one or a plurality.

A flow in FIG. 5 shows an example of the process of generating the information for reproducing the moving image summary by one operation. The video segment to be summary-reproduced is selected in step S501, and the start and end points of partial reproduction are specified in step S502. This process may be performed either by manually setting the partial reproduction section while visually checking the moving image actually or by performing some image analysis to automatically extract the partial moving image. As for the automatic extraction method by means of the image analysis, a section of hard action or that of little action may be detected as the partial moving image to be reproduced, for instance. It is possible, as a matter of course, to determine the partial moving image to be reproduced by another technique, whatever technique it may be.

In step S503, it is determined whether or not the partial reproduction section for performing further summary reproduction exists in the video segment specified in step S501 (it is determined by whether or not there was an instruction to set another partial reproduction section, for instance), and in the case where it exists, it returns to step S502 and specifies the other partial reproduction section. Thus, it is possible to set a plurality of partial reproduction sections in the same video segment. If instructed to the effect that there is no more partial reproduction section to be specified, it proceeds from step S503 to step S504 to determine whether or not there is another video segment to which the partial reproduction section should be set (it is determined by whether or not another video segment to which the partial reproduction section should be set was specified, for instance). And it returns to step S501 if there is another video segment, or finishes this process if none.

The partial reproduction section information 112 as shown in FIG. 12 is generated as above, and is stored in the external storage device 107. The partial reproduction section information 112 is the information for reproducing the moving image summary, and is not changed by virtual editing mentioned later. As shown in FIG. 12, the partial reproduction section information 112 is represented in a form of a list of the partial moving image to be reproduced as the moving image summary for each video segment. In addition, the partial moving image is represented as the start and end points like the video segment section information 110. Moreover, while FIG. 12 represents the section of the partial moving image with the time code, a frame number and so on may also be used, and the form of representation does not matter as far as it can represent the video section just as in the case of the video segment section information 110.

Returning to FIG. 2, the video segment section information 110, meta-data information 111 and partial reproduction section information 112 are generated and held in the external storage device 107 by the process of the above steps S201 to S203. Moreover, the generation in the process shown in steps S202 and S203 (generation of the meta-data information 111 and partial reproduction section information 112) may be performed irrespective of timing after forming the video segments (after the process of step S201). In addition, it is also possible to generate the partial reproduction section information 112 first.

On finishing the above process, it proceeds to step S204 onward, and the process according to various operations is performed. If there is the operation for starting editing from the operation portion 105, it proceeds from step S204 to step S205 so as to edit the moving image. As described below, the editing process performed here is virtual, and the video segment editing result information 113 is generated and stored as a result of the editing. Hereafter, the editing process in step S205 and the editing result information consequently generated will be described by referring to FIGS. 6 and 13.

Figure 6:
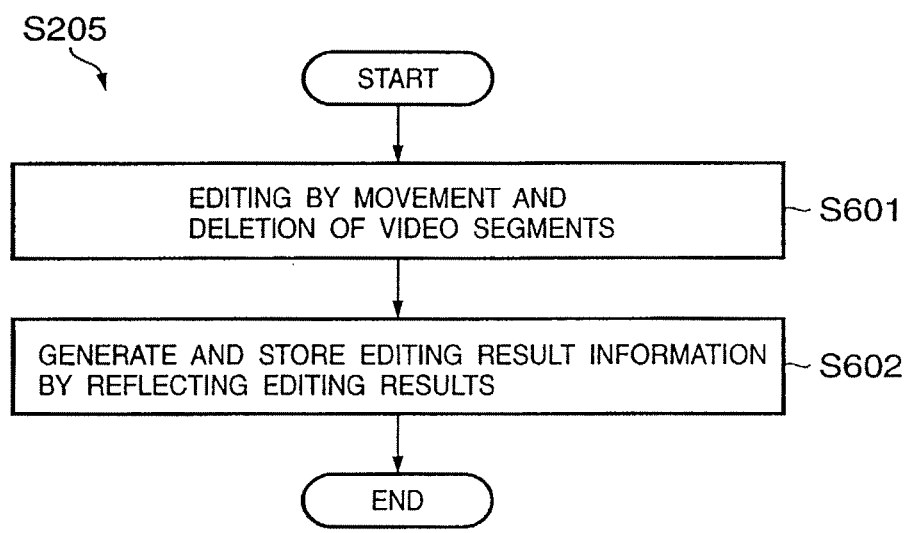
FIG. 6 is a flowchart describing an editing process of moving image according to this embodiment.

FIG. 6 is a flowchart describing the editing process of the moving image according to step S205. In addition, FIG. 13 is a diagram showing an example of a data configuration of the editing result information according to this embodiment.

First, in step S601, the editing process of the moving image is performed by the operations via the operation portion 105. The editing process performed here is movement and deletion of the video segments. The method of specifying an arrangement of the video segments in the editing operations of this embodiment is, as with an existing editing system, to display representative image frames of the scenes (video segments) as icons and replace order thereof or delete them. It is also possible, however, to implement it by another editing operation method, whatever technique it may be.

The editing referred to in this embodiment is not to rearrange the video segments as the original moving image is edited but to rearrange the video segment IDs in edited order and reproduce the video segments in the rearranged order of the video segment IDs so as to implement it. To be more specific, it is the virtual editing. In addition, a deleted video segment is not deleted in reality, but it is just not reproduced.

Next, in step S602, the editing result information 113 reflecting on the contents of the editing performed in step S601 is generated, and is stored in the external storage device 107. The editing result information 113 will be described by referring to FIG. 13.

Segment arrangement information before performing the editing is sequential as shown in Initial in FIG. 13. As opposed to this, an edited record 1301 (indicates the edited arrangement of the video segments) having the editing operations performed thereto in step S601 and reflecting the editing results in step S602 is generated. This record 1301 has the edited segment arrangement information stored therein, where the ID with "*" is the video segment instructed to be deleted by the editing operation. Accordingly, if the edited video is reproduced in this example, the video segments are reproduced and finished by random access in order of 0→1→3→4. It is also possible, as a matter of course, to have the order of the video segments replaced by the editing such as 0→1→4→3.

Moreover, while "*" is used as a method of representing the deleted video segment, any method may be used as far as it can be distinguished from an undeleted video segment. Or a method of separately managing the deleted video segment IDs is also thinkable. In addition, initial segments and information are redundant since they are merely sequential, and so it is also feasible to retain only the edited segments and information.

Incidentally, according to this embodiment, even if the above editing operations are performed, only the video segments and information to be stored in the editing result information 113 are updated, so that there is no change in relationship between the segment IDs and the video segments. For this reason, the relationship between the meta-data and the video segments is also assured. Accordingly, even at the moment when the editing is performed and the video segments and information are updated, there arises no inconsistency in referring to the schema (meta-data information 111) shown in FIG. 11 so that it is equivalent to having the meta-data updated in synchronization with the moving image editing.

Returning to FIG. 2, if instructed to reproduce the moving image, it proceeds from step S206 to step S207 so as to reproduce the specified moving image. Moreover, when reproducing the moving image, the editing result information (FIG. 13) is referred to, and in the case where the edited record 1301 exists, the video segments are reproduced according to it. In the example of FIG. 13, the video segments are reproduced in order of 0→1→3→4.

In addition, if instructed to reproduce the summary, it proceeds from step S208 to step S209 so as to reproduce the summary reflecting on the editing results. At this time, if the moving image editing is performed as mentioned above, the arrangement of the video segments is changed. Therefore, at the time of reproducing the summary, a person seeing it will have a sense of incongruity due to the inconsistency in time series between moving image reproduction time and summary reproduction time unless the partial moving image is reproduced in keeping with the arrangement thereof. In addition, it is not adequate to reproduce as the summary the partial moving image included in the video segments deleted in the editing, and so such partial moving image should not be reproduced when reproducing the summary.

Figure 7:
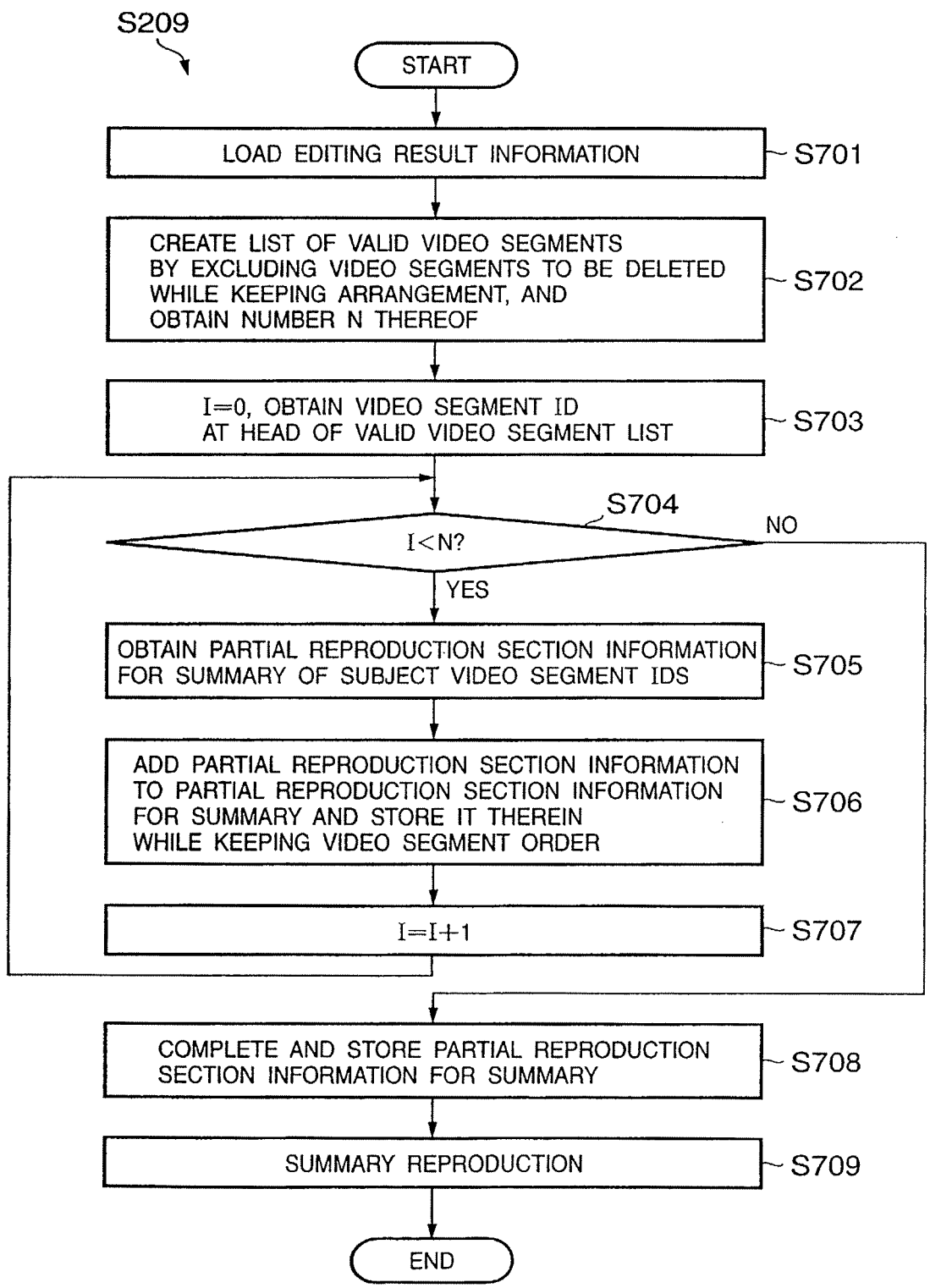
FIG. 7 is a flowchart describing a procedure of summary reproduction according to this embodiment.

The summary reproduction according to this embodiment solves the above problems, and will be described hereafter by referring to FIGS. 7 and 14. FIG. 7 is a flowchart describing the procedure of summary reproduction performed in step S209. FIG. 14 is a diagram showing an example of the partial reproduction section information for the summary reproduction reflecting the editing results.

In step S701, the editing result information of an image specified to be summary-reproduced is read. And in step S702, a list of valid video segments keeping the video segment arrangement is created by excluding the video segments to be deleted while keeping the video segment arrangement shown in the record 1301 of the editing result information. And the number of the valid video segments in the list is obtained and is referred to as N. And in step S703, a loop counter I is reset at 0 to obtain the video segment ID at the head of the list generated in step S702.

In step S704, it is determined whether or not it is I<N, that is, whether or not the loop counter I exceeded the number N of the valid video segments of the list, and the process is branched to step S705 while not exceeding it, or to step S708 if exceeded it.

In step S705, the partial reproduction section information 112 (FIG. 12) is referred to obtain the partial reproduction section information for the summary of the video segments corresponding to the video segment IDs to be processed currently. Moreover, in the case where one video segment ID has a plurality of pieces of partial reproduction section information, all of them are obtained.

Subsequently in step S706, the partial reproduction section information obtained in step S705 is added to the partial reproduction section information for the summary. At this time, the newly obtained partial reproduction section information is added after the information added in the previous process so as to keep the order of the list (that is, the video segment order of the editing result information) generated in step S702.

In a subsequent step S707, the loop counter I is incremented by I=I+1, and it returns to step S704. Thus, the process of steps S705 and S706 is repeated until the loop counter becomes I<N so as to generate the partial reproduction section information 114 for the summary.

Thus, as an example thereof is shown in FIG. 14, the partial reproduction section information 114 for the summary retains the arrangement of the video segments represented in the record 1301 of the editing result information in FIG. 13.

If I>N is confirmed in step S704, it proceeds to step S708 to complete the partial reproduction section information 114 for the summary and stores it in the external storage device 107. And in step S709, the partial moving image is sequentially reproduced to reproduce the summary by referring to the partial reproduction section information 114 stored in step S708.

According to the above process, the corresponding partial moving image is reproduced according to reproduction order of the edited video segments so that it allows the summary reproduction to be automatically corresponding to the editing results.

Returning to FIG. 2 again, if instructed to search the moving image by the operation portion 105, it proceeds from step S210 to step S211 so as to perform a search by using the meta-data. Even in the case of searching the video segments by using the meta-data, it is checked by using the editing result information as to whether the video segment meeting a search condition in a meta-data search has become the video segment deleted by the editing so as not to show the deleted video segment in the search hit results.

Figure 8:
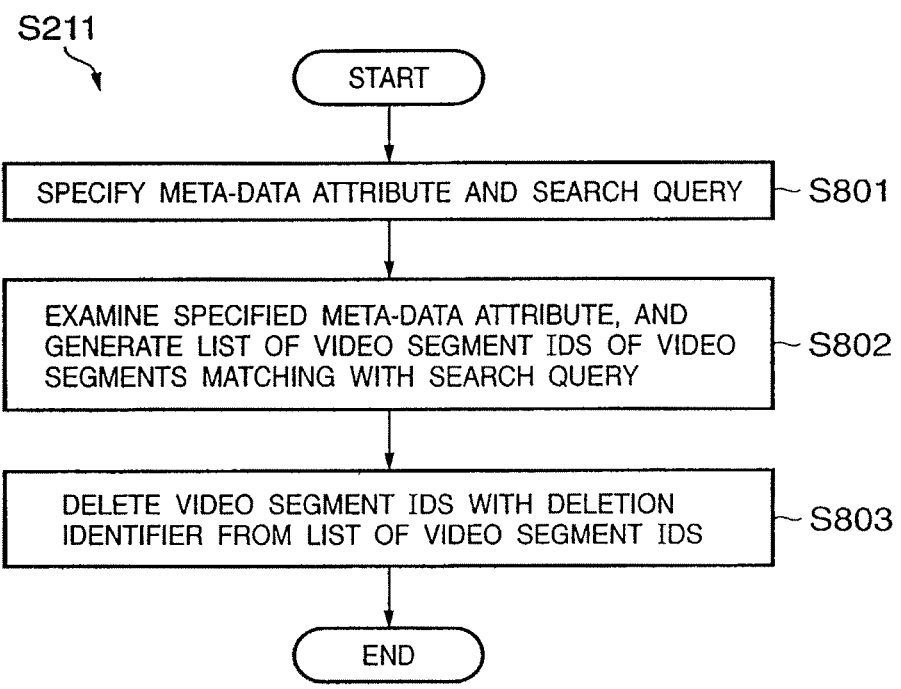
FIG. 8 is a flowchart describing a search process according to this embodiment.

FIG. 8 is a flowchart describing a search process in step S211. In this process, the video segments deleted by the editing are excluded from the search results.

First, in step S801, a meta-data attribute to be searched for and a search query are specified. In this embodiment, as shown in FIG. 11, the meta-data includes a plurality of attributes ("object," "annotation" and so on), and they have their values recorded respectively. In step S801, the search query is specified, and the attribute of the meta-data for examining whether or not the data matching with the search query exists is specified.

In step S802, the meta-data of the meta-data attribute specified in step S801 is examined, and a list of the video segment IDs matching with the search query is generated. In step S803, the video segments and arrangement (record 1301) after editing the editing result information are referred to, and the video segment IDs with "*" mark (IDs of the video segments deleted by the editing) are excluded from the list generated in step S802. In the example in FIG. 13, IDs=2, 5 is are deleted, and so they are deleted in the case where they exist in the list generated in step S802.

For instance, in the case where the "object" is selected as the meta-data attribute and the video segment showing a hand is searched for, it hits the video segment IDs=1 and 2 from the meta-data information in FIG. 11. However, the video segment ID=2 is deleted from the editing result information 113 so that only the video segment ID=1 is returned as the search results.

The above process can prevent the data deleted by the editing from being included in the search results.

In addition, it is also feasible, other than excluding the video segments deleted as a result of the editing from the search results, to reflect the arrangement of the video segment IDs obtained as the editing results when presenting the search results (presenting the search results in order of the arrangement of the video segment IDs, for instance).

In addition, while the above embodiment used a conceptual diagram for storing the video segment section information 110, meta-data information 111, partial reproduction section information 112 and editing result information 113 in fixed fields, it is not limited thereto. For instance, as the attribute can be represented by using an identifier (TAG) in the case of using a structure description language such as XML, HTML or SGML, size and description positions are no longer limited. Moreover, the series of information such as 110, 111, 112 and 113 can be represented by using another structure description language.

In addition, while a unit of the editing is the video segment in this embodiment, it may also be a shot or the unit based on understanding of the contents.

In addition, while the search was performed by covering the entire field to be searched when searching the video segment by using the meta-data according to this embodiment, it is also feasible to prepare an index for an efficient search in advance so as to efficiently obtain the applicable video segment ID by referring to it. For instance, it is assumed that there is a meta-data field for describing a person shown in a video. In the case where three persons A, B and C appear in the video, the index means preparing the list of IDs of the video segments in which A, B and C appear respectively. In the case where there is an instruction to search for the video segments in which A appears, it is very fast since the above list of IDs of the video segments in which A appears can be used as-is as the search results. On the other hand, in the case where there is no index, it takes processing time since the search is performed by covering the entire fields describing the persons appearing in the video.

Moreover, it is needless to mention that the object of the present invention is also attained by supplying to a system or an apparatus a storage medium having recorded a program code of software for implementing functions of the aforementioned embodiment and having the program code stored in the storage medium read and executed by a computer (or a CPU or an MPU) of the system or apparatus.

In this case, the program code read from the storage medium itself implements the functions of the aforementioned embodiment, and so the storage medium storing the program code constitutes the present invention.

As for the storage medium for supplying the program code, a floppy disk, a hard disk, an optical disk, a magneto-optical disk, a CD-ROM, a CD-R, a magnetic tape, a nonvolatile memory card, a ROM and so on may be used.

In addition, it is needless to mention that it includes not only the cases where execution of the program code read by the computer implements the functions of the aforementioned embodiment but also the cases where an OS (operating system) and so on operating on the computer perform a part or all of the actual process based on an instruction of the program code and the functions of the aforementioned embodiment is thereby implemented.

Furthermore, it is needless to mention that it includes the cases where the program code read from the storage medium is written to a memory provided to a feature expansion board inserted into the computer or a feature expansion unit connected to the computer, and thereafter the CPU and so on provided to the feature expansion board or the feature expansion unit performs a part or all of the actual process based on the instruction of the program code and the functions of the aforementioned embodiment is thereby implemented.

As described above, it is possible, according to the present invention, to have the virtual editing of the moving image automatically followed by the adaptation of the meta-data search result, alleviating a burden of reediting the meta-data of an editor.

In addition, according to the present invention, the summary result is automatically adapted following the virtual editing of the moving image so as to allow the summary reproduction which does not give the sense of incongruity even after the editing of the moving image.

As many apparently widely different embodiments of the present invention can be made without departing from the spirit and scope thereof, it is to be understood that the invention is not limited to the specific embodiments thereof except as defined in the claims.

What is claimed is:

1. A moving image data processing apparatus, comprising: a segment managing unit adapted to manage moving image data that have been divided into a plurality of segments each comprised of a plurality of frames and to manage each segment to which an ID is assigned; a partial frame group management unit adapted to manage a partial frame groups, each group including a plurality of continuous frames extracted from a segment which is one of the plurality of segments, wherein the plurality of continuous frames extracted from the segment is not all of the frames included in the segment, by associating the partial frame group with the ID corresponding to the segment of an extraction source thereof; an editing unit adapted to rearrange the IDs respectively assigned to the plurality of segments without rearranging the plurality of segments of the moving image data; an editing result storing unit adapted to store an arrangement of the IDs edited by the editing unit; and a summary reproduction unit adapted to automatically and sequentially reproduce the partial frame groups managed by said partial frame group management unit according to the arrangement of the IDs stored in said editing result storing unit.

2. The apparatus according to claim 1, wherein said editing result storing unit further stores deletion information indicating an ID of a segment, deletion of which is indicated by said editing unit, without deleting corresponding data of the segment of the moving image data, and wherein said summary reproduction unit does not reproduce a partial frame group associated with an ID indicated by the deletion information.

3. A moving image data processing apparatus, comprising: a segment managing unit adapted to manage moving image data that have been divided into a plurality of segments each comprised of a plurality of frames and to manage each segment to which an ID is assigned; an editing unit adapted to rearrange the IDs respectively assigned to the plurality of segments without rearranging the plurality of segments of the moving image data; an editing result storing unit adapted to store an arrangement of the IDs edited by the editing unit; a meta-data managing unit adapted to manage meta-data respectively corresponding to each of the plurality of segments by respectively associating the meta-data with the IDs corresponding to each of the plurality of segments; a search unit adapted to search for an image by using the meta-data; and a reflecting unit adapted to automatically reflect the contents stored by said editing result storing unit on search results of said search unit, wherein said reflecting unit presents the search results according to the arrangement of the IDs after the editing stored by said editing result storing unit.

4. The apparatus according to claim 3, wherein the editing results stored by said editing result storing unit include deletion information for showing an ID of a segment, deletion of which is indicated by said editing unit, without deleting corresponding data of the segment of the moving image data, and
wherein said reflecting unit deletes search results corresponding to the ID shown in the deletion information from the search results.

5. A moving image data processing method, comprising: a segment managing step of managing moving image data that have been divided into a plurality of segments each comprised of a plurality of frames and managing each segment to which an ID is assigned; a partial frame group management step of managing partial frame groups, each group including a plurality of continuous frames extracted from a segment which is one of the plurality of segments, wherein the plurality of continuous frames extracted from the segment is not all of the frames included in the segment, by associating the partial frame group with the ID corresponding to the segment of an extraction source thereof; an editing step of rearranging the IDs respectively assigned to the plurality of segments without rearranging the plurality of segments of the moving image data; an editing result storing step of storing, in a storage unit, an arrangement of the IDs edited in the editing step; and a summary reproduction step of automatically and sequentially reproducing the partial frame groups managed in said partial frame group management step according to the arrangement of the IDs stored in the storage unit.

6. The method according to claim 5, wherein said summary reproduction step sequentially reproduces partial frame groups managed by said partial frame group management step according to arrangement of the IDs stored in the storage unit.

7. The method according to claim 5, wherein said editing result storing step further stores, in the storage unit, deletion information indicating an ID of a segment, deletion of which is indicated by said editing unit, without deleting corresponding data of the segment of the moving image data, and
wherein a partial frame group associated with an ID indicated by the deletion information is not reproduced in said summary reproduction step.

8. A moving image data processing method, comprising: a segment managing step of managing moving image data that have been divided into a plurality of segments each comprised of a plurality of frames and managing each segment to which an ID is assigned; an editing step of rearranging the IDs respectively assigned to the plurality of segments without rearranging the plurality of segments of the moving image data; an editing result storing step of storing, in a storage unit, an arrangement of the IDs edited in the editing step; a meta-data managing step of managing meta-data respectively corresponding to each of the plurality of segments by respectively associating the meta-data with the IDs corresponding to each of the plurality of segments; a search step of searching for an image by using the meta-data; and a reflecting step of automatically reflecting the contents stored in the storage unit in said editing result storing step on search results of said search step, wherein said reflecting step presents the search results according to the arrangement of the IDs after the editing stored in the storage unit by said editing result storing step.

9. The method according to claim 8, wherein the editing results stored in the storage unit by said editing result storing step include deletion information for showing an ID of a segment, deletion of which is indicated by said editing unit, without deleting corresponding data of the segment of the moving image data, and
wherein said reflecting step deletes search results corresponding to the ID shown in the deletion information from the search results.

10. A non-transitory storage medium for storing a control program for causing a computer to execute a moving image data processing method according to claim 5.

11. A non-transitory storage medium for storing a control program for causing a computer to execute a moving image data processing method according to claim 8.

12. A moving image data processing apparatus, comprising: segment managing means for managing moving image data that have been divided into a plurality of segments each comprised of a plurality of frames and for managing each segment to which an ID is assigned; partial frame group management means for managing partial frame groups, each group including a plurality of continuous frames extracted from a segment which is one of the plurality of segments, wherein the plurality of continuous frames extracted from the segment is not all of the frames included in the segment, by associating the partial frame group with the ID corresponding to the segment of an extraction source thereof; editing means for rearranging the IDs respectively assigned to the plurality of segments without rearranging the plurality of segments of the moving image data; editing result storing means for storing an arrangement of the IDs edited by the editing means; and summary reproduction means for automatically and sequentially reproducing the partial frame groups managed by said partial frame group management means according to arrangement of the IDs stored in said editing result storing means.

13. A moving image data processing apparatus, comprising: segment managing means for managing moving image data that have been divided into a plurality of segments each comprised of a plurality of frames and for managing each segment to which an ID is assigned; editing means for rearranging the IDs respectively assigned to the plurality of segments without rearranging the plurality of segments of the moving image data; editing result storing means for storing an arrangement of the IDs edited by the editing means; meta-data managing means for managing meta-data respectively corresponding to each of the plurality of segments by respectively associating the meta-data with the IDs corresponding to each of the plurality of segments; search means for searching for an image by using the meta-data; and reflecting means for automatically reflecting the contents stored by said editing result storing means on search results of said search means, wherein said reflecting means presents the search results according to the arrangement of the IDs after the editing stored by said editing result storing means.

* * * * *